US012626715B2

(12) United States Patent
Ju

(10) Patent No.: US 12,626,715 B2

(45) Date of Patent: May 12, 2026

(54) ROLE SEPARATION METHOD, ELECTRONIC DEVICE, AND COMPUTER STORAGE MEDIUM

(71) Applicant: ALIBABA DAMO (HANGZHOU) TECHNOLOGY CO., LTD., Hangzhou (CN)

(72) Inventor: Wei Ju, Hangzhou (CN)

(73) Assignee: ALIBABA DAMO (HANGZHOU) TECHNOLOGY CO., LTD., Hangzhou (CN)

( * ) Notice: Subject to any disclaimer, the term of this patent is extended or adjusted under 35 U.S.C. 154(b) by 343 days.

(21) Appl. No.: 18/094,556

(22) Filed: Jan. 9, 2023

(65) Prior Publication Data

US 2023/0238015 A1 Jul. 27, 2023

(30) Foreign Application Priority Data

Jan. 10, 2022 (CN) ......................... 202210023782.5

(51) Int. Cl.

*G10L 17/08* (2013.01)
*G10L 21/028* (2013.01)
*G10L 25/51* (2013.01)

(52) U.S. Cl.

CPC ............ *G10L 21/028* (2013.01); *G10L 25/51* (2013.01)

(58) Field of Classification Search

CPC ........ G10L 21/028; G10L 25/51; G10L 17/08
See application file for complete search history.

(56) References Cited

U.S. PATENT DOCUMENTS 10,582,117 B1 * 3/2020 Tanaka .................... G06F 3/013
2013/0195285 A1 * 8/2013 De La Fuente .......... G07C 9/37 704/E15.001
2015/0301796 A1 * 10/2015 Visser ..................... G10L 17/22 715/728
2019/0341057 A1 * 11/2019 Zhang ..................... G10L 17/18
2020/0058293 A1 * 2/2020 Zhang ................... G10L 15/063
2020/0211561 A1 * 7/2020 Degraye ................. G10L 15/26
2023/0038039 A1 * 2/2023 Zhao ......................... G01S 5/22

FOREIGN PATENT DOCUMENTS

CN 108305615 A 7/2018
CN 109754811 A 5/2019
WO WO-2020042992 A1 * 3/2020 ......... G10L 21/0272

OTHER PUBLICATIONS

First Office Action with English translation, dated Mar. 21, 2025, 20 pages.

* cited by examiner

*Primary Examiner* — Pierre Louis Desir
*Assistant Examiner* — Cody Douglas Hutcheson
(74) *Attorney, Agent, or Firm* — The Sun IP Law

(57) ABSTRACT

Embodiments of the present application provide a role separation method, an electronic device, and a computer storage medium. The role separation method includes: acquiring sound source information of target voice data and a voiceprint feature of the target voice data; determining, according to the sound source information, at least one candidate position corresponding to a sound source position; calculating a similarity between a voiceprint feature of a role corresponding to the at least one candidate position and the voiceprint feature of the target voice data; and determining a target role corresponding to the target voice data according to the similarity. By means of the embodiments of the present application, the accuracy of the role separation is improved.

11 Claims, 3 Drawing Sheets

ROLE SEPARATION METHOD, ELECTRONIC DEVICE, AND COMPUTER STORAGE MEDIUM

The present application claims priority to Chinese patent application No. 202210023782.5, filed with the Chinese Patent Office on Jan. 10, 2022 and entitled "ROLE SEPARATION METHOD, ELECTRONIC DEVICE, AND COMPUTER STORAGE MEDIUM", which is incorporated herein by reference in its entirety.

TECHNICAL FIELD

Embodiments of the present application relate to a technical field of voice processing, and in particular to a role separation method, an electronic device, and a computer storage medium.

BACKGROUND

In many application scenes, for example, a conference scene, a voice communication scene, etc., in order to feedback role information of a speaker to a user, it is necessary to determine an identity or role of the speaker according to voice data of the speaker. Usually, the voice data of different roles may be distinguished according to voiceprint features of the different roles. However, in the process of implementing the above role separation, if voiceprint features of two speakers are relatively similar, a large error will be generated during the role separation and wrong information will be fed back to the user.

SUMMARY

In view of this, embodiments of the present application provide a role separation solution to solve a part or all of the above problems.

According to a first aspect of an embodiment of the present application, a role separation method is provided, which includes: acquiring sound source information of target voice data and a voiceprint feature of the target voice data; determining, according to the sound source information, at least one candidate position corresponding to a sound source position; calculating a similarity between a voiceprint feature of a role corresponding to the at least one candidate position and the voiceprint feature of the target voice data; and determining a target role corresponding to the target voice data according to the similarity.

According to a second aspect of an embodiment of the present application, a role separation apparatus is provided, which includes: an acquisition module, configured for acquiring sound source information of target voice data and a voiceprint feature of the target voice data; a candidate module, configured for determining, according to the sound source information, at least one candidate position corresponding to a sound source position; a similarity module, configured for calculating a similarity between a voiceprint feature of a role corresponding to the at least one candidate position and the voiceprint feature of the target voice data; and a role separation module, configured for determining a target role corresponding to the target voice data according to the similarity.

According to a third aspect of an embodiment of the present application, an electronic device is provided, which includes: a processor, a memory, a communication interface and a communication bus, wherein the processor, the memory and the communication interface communicate with each other via the communication bus; and the memory is configured for storing at least one executable instruction, and the executable instruction causes the processor to perform operations corresponding to the role separation method in the first aspect.

According to a fourth aspect of an embodiment of the present application, a computer storage medium is provided, which stores a computer program, wherein the computer program, when executed by a processor, implements the role separation method in the first aspect.

According to the role separation solution provided by the embodiments of the present application, sound source information of target voice data and a voiceprint feature of the target voice data are acquired, at least one candidate position corresponding to a sound source position is determined according to the sound source information, a similarity between a voiceprint feature of a role corresponding to the candidate position and the voiceprint feature of the target voice data is calculated, and a target role corresponding to the target voice data is determined according to the similarity. Because the candidate position is filtered first according to the sound source position indicated by the sound source information, which reduces the computation amount, and then, the similarity between the voiceprint feature of the role corresponding to the candidate position and the voiceprint feature of the target voice data is calculated, and the target role is determined according to the similarity, which takes into account both the sound source position and the voiceprint feature, and leads to higher accuracy of role separation.

BRIEF DESCRIPTION OF THE DRAWINGS

To describe the technical solutions of the embodiments of the present application or the prior art more clearly, the accompanying drawings to be used in the description of the embodiments or the prior art will be described briefly below. Evidently, the accompanying drawings described below are merely drawings of some embodiments recited in the embodiments of the present application. Those skilled in the art may obtain other drawings based on these accompanying drawings.

DETAILED DESCRIPTION

In order to enable those skilled in the art to better understand the technical solutions in the embodiments of the present application, the technical solutions in the embodiments of the present application will be described clearly and completely below in combination with the accompanying drawings of the embodiments of the present application. Obviously, the embodiments described are merely a part of the embodiments of the present application, not all of the embodiments. All other embodiments obtained by those skilled in the art based on the embodiments of the present application should fall within the scope of protection of the embodiments of the present application.

The specific implementation of the embodiments of the present application will be further described below in combination with the accompanying drawings of the embodiments of the present application.

First Embodiment

Figure 1:
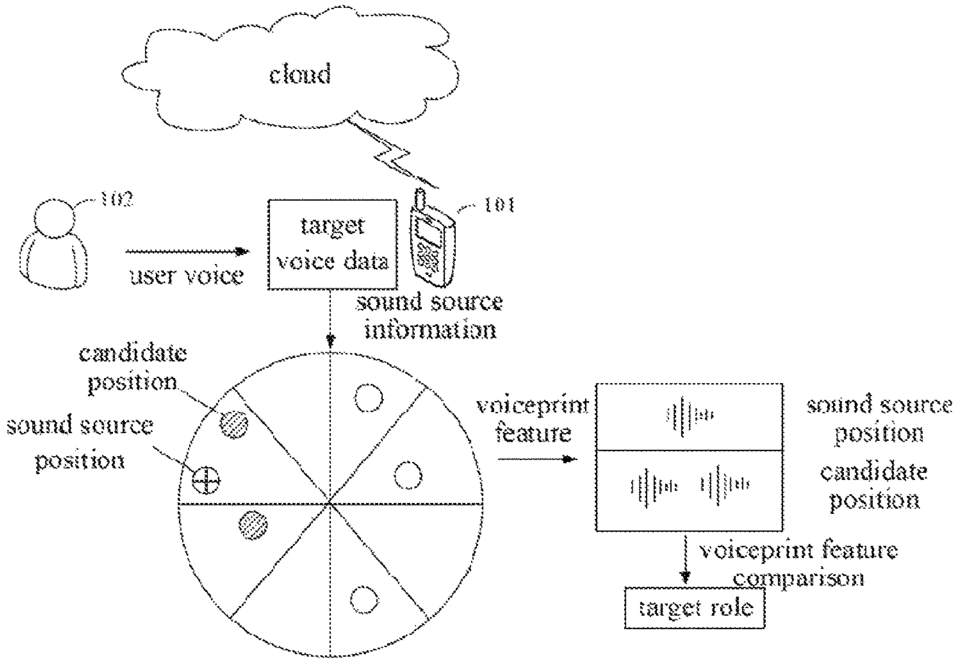
FIG. 1 is a schematic diagram of an application scene of a role separation method provided by the first embodiment of the present application.

The first embodiment of the present application provides a role separation method, which is applied to a terminal device. To facilitate understanding, an application scene of the role separation method provided by first embodiment of the present application is described. Referring to FIG. 1, FIG. 1 is a schematic diagram of an application scene of the role separation method provided by the first embodiment of the present application. The scene shown in FIG. 1 includes an electronic device 101 and a user 102.

The scene shown in FIG. 1 may be a conference room. When the user speaks, the electronic device 101 acquires sound source information of target voice data and a voiceprint feature of the target voice data, determines, according to the sound source information, a candidate position corresponding to a sound source position, calculates a similarity between a voiceprint feature of a role corresponding to the candidate position and the voiceprint feature of the target voice data, and determines a role, i.e. a target role, of the user speaking according to the similarity.

The electronic device 101 may access a network, and may be connected, through the network, to a cloud and conduct data interaction with the cloud. In the present application, the network includes Local Area Network (LAN), Wide Area Network (WAN), and mobile communication network, e.g., World Wide Web (WWW), Long Term Evolution (LTE) Network, 2nd Generation Mobile Network, 3rd Generation Mobile Network, 5th Generation Mobile Network, etc. The cloud may include various devices connected through the network, e.g., server, relay device, Device-to-Device (D2D) device, etc. Of course, the above examples are only illustrative herein, which do not mean that the present application is limited to these examples.

Figure 2:
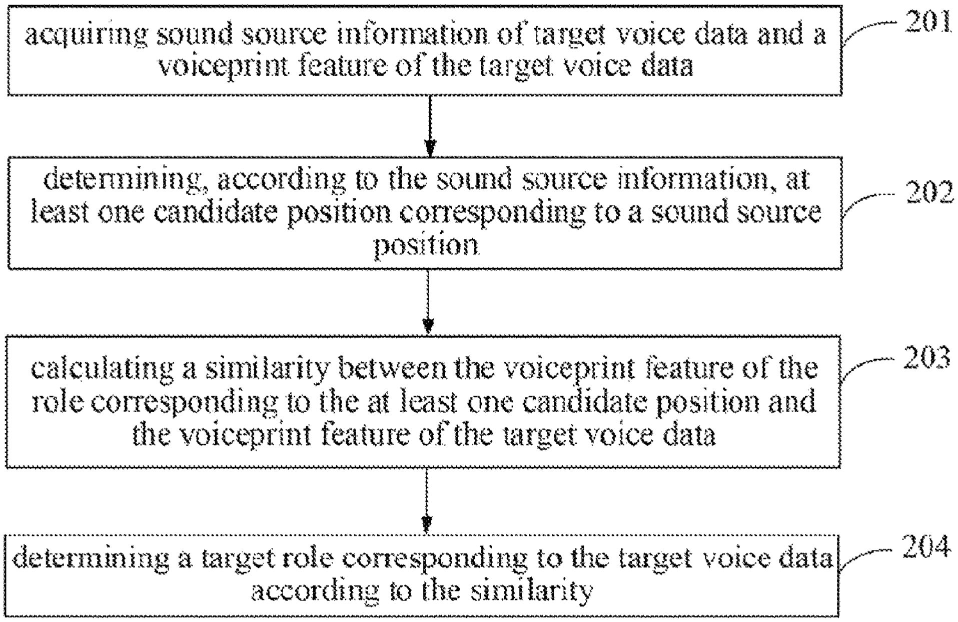
FIG. 2 is a flow chart of a role separation method provided by the first embodiment of the present application.

Combined with the scene shown in FIG. 1 above, the first embodiment of the present application provides a role separation method, which is applied to an electronic device. It should be noted that FIG. 1 is only an exemplary application scene of the role separation method of the present application, which does not mean that the role separation method of the present application must be applied to the scene shown in FIG. 1. Referring to FIG. 2, FIG. 2 is a flow chart of a role separation method provided by the first embodiment of the present application. The method includes the following Steps 201-204.

At the Step 201, acquiring sound source information of target voice data and a voiceprint feature of the target voice data.

It should be noted that the target voice data refers to voice data of the role which needs to be determined, and the voice data may be divided into at least one data frame by time. The sound source information is used for indicating the position of the sound source of the target voice data, that is, the position of the user who made the voice. The voiceprint feature is used for indicating an acoustic frequency spectrum feature of the user who made the voice. The user who made the voice is the user whose role needs to be determined.

Optionally, in an implementation, the sound source information may be determined by using a sound source positioning technology according to a sound wave received by a microphone. Further, optionally, the voiceprint feature may be obtained by performing feature extraction on the target voice data by using a neural network model. Of course, the above example is only illustrative.

Optionally, when initial voice data is acquired, the initial voice data may be segmented according to the sound source information of the initial voice data, to take voice segment at the same sound source position as the target initial voice data. For example, if the initial voice data includes voice data at two sound source positions, two voice segments are obtained by performing the segmentation at the change between the sound source positions, and the two voice segments both may be used as the target voice data to determine roles. Each piece of target voice data includes only a voice of one user, further improving the accuracy of the role separation.

At the Step 202, determining, according to the sound source information, at least one candidate position corresponding to a sound source position.

It should be noted that at least one candidate position corresponding to the sound source position may be filtered out according to the sound source information, to determine whether the role corresponding to the candidate position is at the position of the target role. Illustratively, in some application scenes, a position, where the azimuth change difference value between the position and the sound source position is less than or equal to a preset change difference value, may be taken as a candidate position. In other application scenes, all positions may be taken as candidate positions. Of course, the above example is only illustrative.

Optionally, in one example, whether the number of frames of the target voice data is enough may be first determined. If the number of frames of the target voice data is too small, the target role may be determined directly according to the azimuth difference between the position of the sound source and the position of historical voice data. If the number of frames of the target voice data is enough, the candidate position may be further determined. For example, the determining, according to the sound source information, the at least one candidate position corresponding to the sound source position, includes: in a case where the number of frames of the target voice data is larger than a preset frame number, determining whether the target voice data is first voice data; in a case where the target voice data is not the first voice data, determining, according to the sound source information, the at least one candidate position corresponding to the sound source position; and in a case where the target voice data is the first voice data, generating a new position as a candidate position according to the sound source information of the target voice data. The preset frame number may be set according to the specific situation. Optionally, the preset frame number may be larger than or equal to 50, or the preset frame number may be larger than or equal to 100, etc.

Optionally, based on the above example, in an implementation, in a case where the target voice data is not the first voice data, the determining, according to the sound source information, the at least one candidate position corresponding to the sound source position, includes: in a case where the target voice data is not the first voice data, calculating, according to the sound source information, an azimuth change difference value between the sound source position and a position, in existing positions, which has the closest azimuth to the sound source position; in a case where the azimuth change difference value is larger than a preset change difference value, determining the existing positions, other than the position which has the closest azimuth to the sound source position, as the candidate positions; and in a case where the azimuth change difference value is not larger than the preset change difference value, determining the position, which has the closest azimuth to the sound source position, as the candidate position. If the azimuth change difference value is larger than the preset change difference value, it indicates that the position which has the closest azimuth to the sound source position is far from the sound source position in space, thereby not indicating the same user. At this time, it is likely that the user corresponding to the target voice data has moved. Therefore, other existing positions are taken as the candidate positions to be further filtered, to ensure high accuracy of role determination when the user moves.

In an example, in a case where the target voice data is not the first voice data and the azimuth change difference value is larger than the preset change difference value, as described above, the existing positions are determined as the candidate positions, and then, the following Steps 203 and 204 are performed, to determine a target role according to a similarity between the voiceprint feature of a role corresponding to the candidate position and the voiceprint feature of the target voice data. As described above, there may be a case where the user moves. In this case, the corresponding relationship between the target voice data and the candidate position may be recorded. In this way, for a voice section that includes multiple roles and has multiple segments of target voice data, after a target role corresponding to each piece of target voice data is determined, which target voice data a certain specific target role corresponds to in the voice section and how the positions for the target voice data have changed may be further determined according to the corresponding relationships between target roles and candidate positions. That is, after the target role is determined, the corresponding relationship between the target role and the candidate position with the highest voiceprint feature similarity may be recorded. According to the corresponding relationship, it is determined whether the candidate positions in multiple (two or more) pieces of target voice data (including current target voice data and historical target voice data corresponding to the target role) corresponding to the target role have changed. If the candidate positions have changed, position change information of the target role may be determined according to the change.

At the Step 203, calculating a similarity between the voiceprint feature of the role corresponding to the at least one candidate position and the voiceprint feature of the target voice data.

It should be noted that the similarities for the voiceprint features may be obtained by calculating a Euclidean distance between two voiceprint features, or by scoring with Probabilistic Linear Discriminant Analysis (PLDA).

At the Step 204, determining a target role corresponding to the target voice data according to the similarity.

It should be noted that the higher the similarity is, the larger the possibility that the role corresponding to the candidate position is the same as the role corresponding to the target voice data is. Therefore, the target role may be determined according to a magnitude of the similarity. Illustratively, the determining the target role corresponding to the target voice data according to the similarity, includes: determining a role, from the roles corresponding to the candidate positions, whose voiceprint feature corresponds to the largest similarity, as the target role. The role whose voiceprint feature of the target voice data corresponds to the largest similarity is determined as the target role, thereby more accurately separating the target role.

Based on the example in the above Step 202, two scenes are listed here to explain how to determine the target role respectively.

Optionally, in the first scene, the determining the target role corresponding to the target voice data according to the similarity, includes: in a case where the target voice data is not the first voice data, calculating, according to the sound source information, an azimuth change difference value between the sound source position and a position, in existing positions, which has the closest azimuth to the sound source position; in a case where the azimuth change difference value is less than or equal to a preset change difference value and the similarity is larger than a preset similarity, determining a role corresponding to the similarity as the target role; and in a case where the azimuth change difference value is less than or equal to the preset change difference value and the similarity is less than or equal to the preset similarity, calculating similarities between voiceprint features corresponding to other positions within a region where the candidate position is located and the voiceprint feature of the target voice data, and determining a role corresponding to a voiceprint feature with a similarity larger than the preset similarity as the target role. In a case where the target voice data is not the first voice data, it indicates that there is already historical voice data, that is, there is already another role. Therefore, it is necessary to determine whether the role corresponding to the target voice data is another role that has spoken, to avoid omission. If the azimuth change difference value is less than or equal to the preset change difference value, it indicates that the position which has the closest azimuth to the sound source position is very close to the sound source position, which is likely to refer to the same role. However, if the azimuth change difference value is larger than the preset change difference value, it indicates that the position which has the closest azimuth to the sound source position is far from the sound source position, it is likely that the speaker has moved, and the other positions within the region where the candidate position is located need to be filtered. The azimuth change difference value may be expressed by a size of an angle formed by two line segments, i.e., a line segment from the sound source position to a reference point and a line segment from the position which has the closest azimuth (the candidate position) to the reference point. Illustratively, the preset change difference value may be 40 degrees.

Herein, whether the speaker has moved may be determined based on the corresponding relationship between the target voice data and the candidate position. In this case, each time the target role is determined, it is necessary to record the corresponding relationship between the target voice data and the position which has the closest azimuth, and whether the same target role has removed is determined according to whether the position of the same target role in different target voice data has changed.

For example, a voice section including multiple roles may be segmented according to the change between the sound source positions as described above, to obtain multiple voice segments. In this example, the voice segments are set to include a voice segment 1, a voice segment 2, and a voice segment 3. Each of the voice segments may be used as a target voice data. Alternatively, the voice section may be segmented according to the change of voiceprint features. Illustratively, the voice section is also set to be segmented into the voice segment 1, the voice segment 2, and the voice segment 3.

The settings are as follows: through the above process, the target role of the voice segment 1 is determined to be target role A, and the position X, which has the closest azimuth, corresponding to the target role A is recorded; the target role of the voice segment 2 is determined to be target role B, and the position Y, which has the closest azimuth, corresponding to the target role B is recorded; and the target role of the voice segment 3 is determined to be the target role A, and the position Z, which has the closest azimuth, corresponding to the target role A is recorded. It can be seen that in the voice section, the target role A has spoken twice and moved.

In the first scene, further optionally, the method further includes: in a case where each of the similarities for the voiceprint features corresponding to the other positions within the region where the candidate position is located is less than or equal to the preset similarity, calculating similarities between voiceprint features corresponding to positions within other regions and the voiceprint feature of the target voice data, and determining a role corresponding to a voiceprint feature with a similarity larger than the preset similarity as the target role; and in a case where each of the similarities for the voiceprint features corresponding to the positions within the other regions is less than or equal to the preset similarity, generating a new role, as the target role, for the target voice data. In the first scene, first, the position which has the closest azimuth (that is, the candidate position) is determined; if the azimuth change difference value for the position which has the closest azimuth is larger than the preset change difference value, the range is expanded, and other positions within the region where the position which has the closest azimuth is located are determined; if the similarities for the voiceprint features corresponding to the other positions within the region where the position which has the closest azimuth is located are less than or equal to the preset similarity, the range is further expanded, and positions within the other regions are determined until the target role is determined. In this way, the range is expanded layer by layer based on the sound source position, which not only ensures the accuracy, but also avoids the omission. It should also be noted that the regions may be sectors, and may be distinguished by using different angles. For example, one region is a sector corresponding to 45 degrees, and a scene may be divided into eight regions. There may be at least one position in a region; or, there may be no setting position in the region, and new positions may be gradually created according to the user speaking.

Based on this, a feasible role separation solution of the embodiment of the present application may be implemented as follows: acquiring sound source information of target voice data and a voiceprint feature of the target voice data; determining a space partition to which a sound source position indicated by the sound source information belongs, and determining at least one candidate position corresponding to the sound source position in the space partition; wherein, the space partition is one of multiple space regions formed after a physical space where a speaker corresponding to the target voice data is located is spatially divided according to a preset angle; calculating a similarity between a voiceprint feature of a role corresponding to the candidate position and the voiceprint feature of the target voice data; and determining a target role corresponding to the target voice data according to the similarity. Herein, the preset angle may be set by those skilled in the art according to actual needs, which is not limited in the embodiment of the present application.

Further optionally, the determining the at least one candidate position corresponding to the sound source position in the space partition, may be implemented as: determining whether there is a candidate position corresponding to the sound source position in the space partition; in a case where there is the candidate position corresponding to the sound source position in the space partition, determining the candidate position as the candidate position corresponding to the sound source position in the space partition; and in a case where there is not the candidate position corresponding to the sound source position in the space partition, creating a candidate position in the space partition according to the sound source position.

Referring to FIG. 1 again, in FIG. 1, the physical space where the speaker is located is divided into 3 space regions on average according to 45 degree angles, that is, 8 space partitions. The settings are as follows: according to the sound source information of the target voice data, the space partition to which the corresponding sound source position belongs is determined to be the first partition, that is, the partition where the circle with the "+" symbol in FIG. 1 is located; then, when the candidate position is determined, the candidate position (there may be one or more candidate positions) corresponding to the sound source position is first determined from the first partition; in FIG. 1, there is one candidate position in the first partition together with the sound source position, and the similarity between the voiceprint feature of the role corresponding to the candidate position and the voiceprint feature of the target voice data may be calculated preferentially; and then, the target role corresponding to the target voice data is determined according to the similarity. Of course, if each of the similarities corresponding to the candidate positions in the same space partition is low, the similarities between the voiceprint features of the roles corresponding to the candidate positions in other space partitions and the voiceprint feature of the target voice data may continue to be calculated, for example, the candidate position in the lower partition adjacent to the first partition as shown in FIG. 1.

It is assumed that there is no candidate position in the first partition, and then in this case, a new candidate position may be created in the first partition based on the sound source position. For example, the sound source position may be directly created as a candidate position for use in subsequent needs.

Through the above manner, the target role may be determined more accurately and effectively, and the candidate positions may be supplemented and improved to improve the overall efficiency of the solution.

Optionally, in the second scene, the method further includes: in a case where the number of the frames of the target voice data is less than or equal to the preset frame number, determining candidate voice data closest to an azimuth for the target voice data in historical voice data according to the sound source information; and calculating an azimuth difference between the target voice data and the candidate voice data; and in a case where the azimuth difference is less than a preset threshold value, determining a role corresponding to the candidate voice data as the target role. If the number of the frames of the target voice data is less than or equal to the preset frame number, at this time, the determining may not be performed according to the similarity for the voiceprint feature. Because the number of the frames is too small, the accuracy for calculating the similarity is low. Therefore, the determining may be performed directly according to the azimuth for the historical voice data. It should be noted that in the present application, the azimuth difference between the target voice data and the candidate voice data refers to the azimuth difference between the sound source position corresponding to the target voice data and the position corresponding to the candidate voice data, and may also be understood as the azimuth change difference value. The azimuth difference may be expressed by a size of an angle formed by two line segments, i.e., a line segment from the sound source position to a reference point and a line segment from the position, corresponding to the candidate voice data, which has the closest azimuth, to the reference point. For example, the preset threshold value may be 5 degrees.

Figure 3:
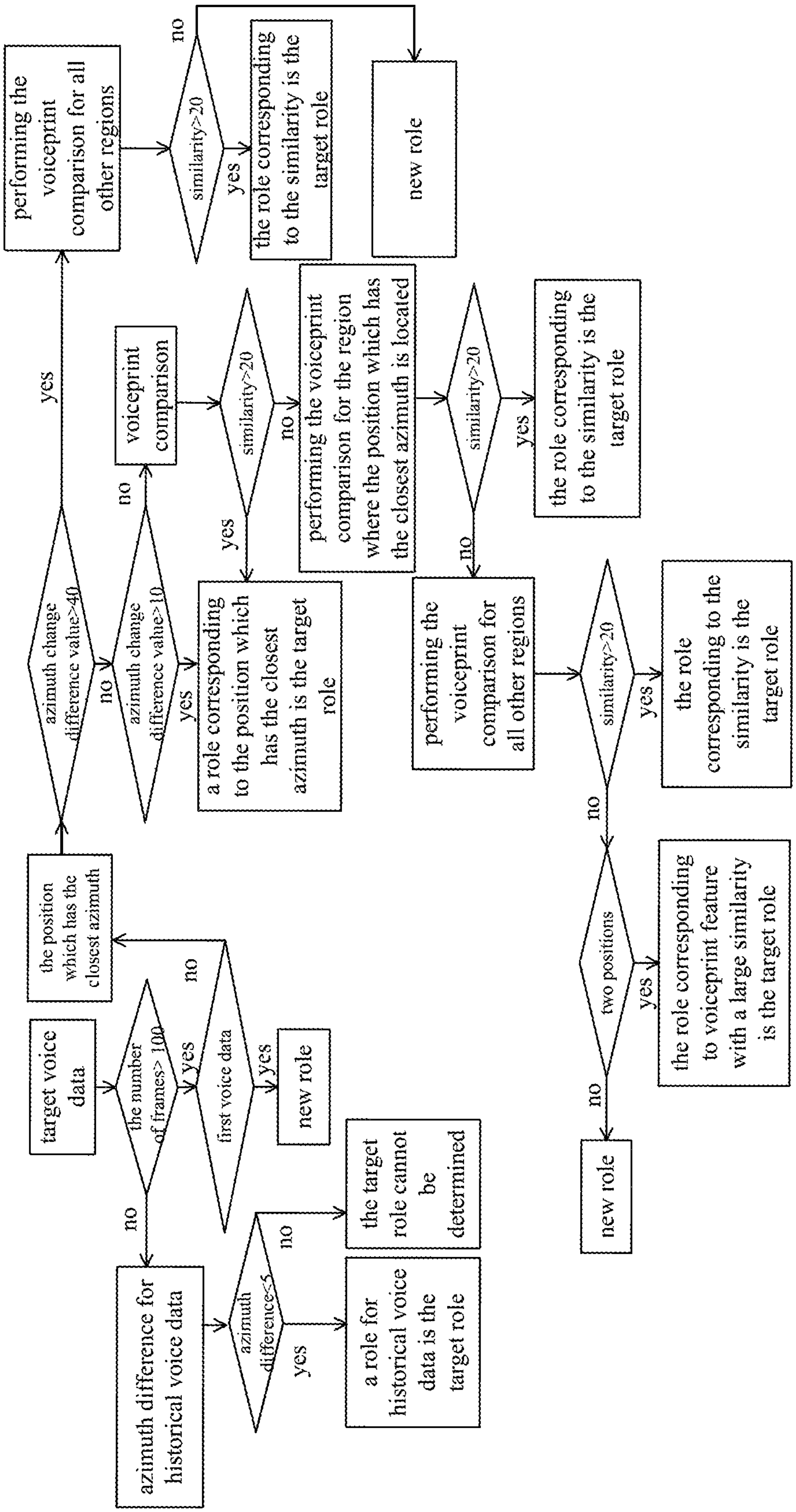
FIG. 3 is a flow block diagram of a role separation method provided by the first embodiment of the present application.

In combination with the role separation method described in the above steps 201-204, a specific application scene is listed here for detailed description. As shown in FIG. 3, FIG. 3 is a flow block diagram of a role separation method provided by the first embodiment of the present application. After the target voice data is acquired, whether the number of frames of the target voice data is larger than a preset frame number (the preset frame number may be 100) is first determined; in a case where the number of the frames of the target voice data is less than or equal to the preset frame number, the target voice data is compared with the historical voice data to determine the candidate voice data which has the closest azimuth, and whether the azimuth difference between the candidate voice data and the target voice data is less than a preset threshold value (the preset threshold value is 5) is determined. In a case where the azimuth difference between the candidate voice data and the target voice data is less than the preset threshold value, the role corresponding to the candidate voice data is the target role, and in a case where the azimuth difference between the candidate voice data and the target voice data is larger than or equal to the preset threshold value, the target role cannot be determined.

In a case where the number of the frames of the target voice data is larger than the preset frame number, whether the target voice data is the first voice data is further determined. In a case where the target voice data is the first voice data, a new role is created for the target voice data as the target role; and a new position and a new region may be also created based on the sound source position of the target voice data. In a case where the target voice data is not the first voice data, positions of all regions are traversed, the position, which has the closest azimuth, of the sound source position for the target voice data is determined, and the azimuth change difference value of the sound source position and the position, which has the closest azimuth, of the sound source position is calculated. Whether the azimuth change difference value is larger than the preset change difference value (the azimuth change difference value may be 40 degrees) is determined. In a case where the azimuth change difference value is larger than the preset change difference value, the voiceprint feature of the target voice data is compared with the voiceprint features of all positions within the other regions, to calculate similarities. In a case where a similarity is larger than a preset similarity, a role at the position corresponding to the similarity is determined as the target role; and in a case where the similarity is less than or equal to the preset similarity, a new role is generated for the target voice data as the target role, and a new position and a new region may also be generated for the target voice data.

In a case where the azimuth change difference value is less than or equal to the preset change difference value, whether the azimuth change difference value is less than a difference value lower limit (the difference value lower limit may be 10 degrees) may be further determined. In a case where the azimuth change difference value is less than the difference value lower limit, the role corresponding to the position which has the closest azimuth may be determined as the target role; and in a case where the azimuth change difference value is larger than or equal to the difference value lower limit, the voiceprint feature corresponding to the position which has the closest azimuth is compared with the voiceprint feature of the target voice data, to calculate the similarity. Whether the similarity is larger than the preset similarity is determined; in a case where the similarity is larger than the preset similarity, the role corresponding to the position which has the closest azimuth is determined as the target role; and in a case where the similarity is less than or equal to the preset similarity, the other positions within the region where the position which has the closest azimuth is located are taken as candidate positions to expand the range of the comparison.

A similarity between a voiceprint feature corresponding to a candidate position and the voiceprint feature of the target voice data is calculated. In a case where the similarity is larger than the preset similarity, the role at the candidate position corresponding to the similarity is taken as the target role; and in a case where the similarity is less than or equal to the preset similarity, the positions within all other regions are taken as candidate positions, to further expand the range of the comparison. A similarity between a voiceprint feature corresponding to a candidate position and the voiceprint feature of the target voice data is calculated. In a case where the similarity is larger than the preset similarity, the role at the candidate position corresponding to the similarity is taken as the target role. In a case where the candidate positions within all the regions are compared completely, and there is no position with a similarity larger than the preset similarity, a new role is generated for the target voice data as the target role, and a new position is set based on the sound source position. It should also be noted that in a case where similarities between voiceprint features of more than two candidate positions in one region and the voiceprint feature of the target voice data are larger than the preset similarity, a role corresponding to a candidate position with the largest similarity in these candidate positions is determined as the target role.

According to the role separation method provided by the embodiment of the present application, sound source information of target voice data and a voiceprint feature of the target voice data are acquired, at least one candidate position corresponding to a sound source position is determined according to the sound source information, a similarity between a voiceprint feature of a role corresponding to the candidate position and the voiceprint feature of the target voice data is calculated, and a target role corresponding to the target voice data is determined according to the similarity. Because the candidate position is filtered first according to the sound source position indicated by the sound source information, which reduces the computation amount, and then, the similarity between the voiceprint feature of the role corresponding to the candidate position and the voiceprint feature of the target voice data is calculated, and the target role is determined according to the similarity, which takes into account both the sound source position and the voiceprint feature, and leads to higher accuracy of role separation.

Second Embodiment

Figure 4:
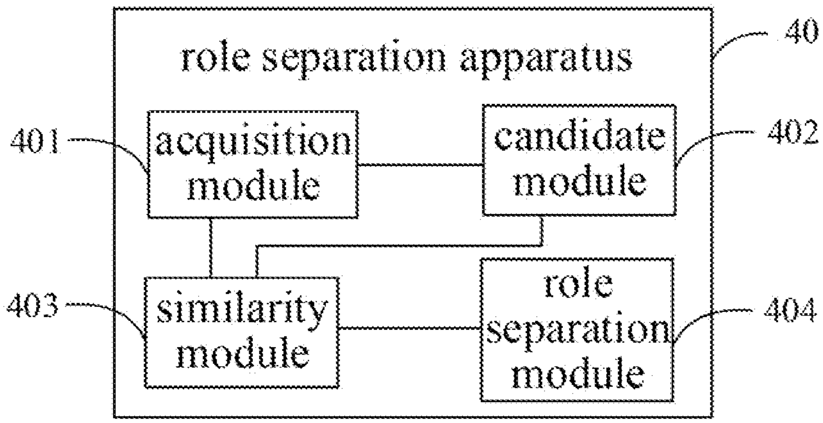
FIG. 4 is a structural diagram of a role separation apparatus provided by the second embodiment of the present application.

Based on the method described in the first embodiment above, the second embodiment of the present application provides a role separation apparatus for implementing the method described in the first embodiment above. As shown in FIG. 4, the role separation apparatus 40 includes: an acquisition module 401, configured for acquiring sound source information of target voice data and a voiceprint feature of the target voice data; a candidate module 402, configured for determining, according to the sound source information, at least one candidate position corresponding to a sound source position; a similarity module 403, configured for calculating a similarity between a voiceprint feature of a role corresponding to the candidate position and the voiceprint feature of the target voice data; and a role separation module 404, configured for determining a target role corresponding to the target voice data according to the similarity.

Optionally, in an embodiment, the role separation module 404 is configured for determining a role, from the roles corresponding to the candidate positions, whose voiceprint feature corresponds to the largest similarity, as the target role.

Optionally, in an embodiment, the candidate module 402 is configured for: in a case where the number of frames of the target voice data is larger than a preset frame number, determining whether the target voice data is first voice data; and in a case where the target voice data is not the first voice data, determining, according to the sound source information, the at least one candidate position corresponding to the sound source position; and in a case where the target voice data is the first voice data, generating a new position as a candidate position according to the sound source information of the target voice data.

Optionally, in an embodiment, the candidate module 402 is configured for: in a case where the target voice data is not the first voice data, calculating, according to the sound source information, an azimuth change difference value between the sound source position and a position, in existing positions, which has the closest azimuth to the sound source position; in a case where the azimuth change difference value is larger than a preset change difference value, determining the existing positions, other than the position which has the closest azimuth to the sound source position, as the candidate positions; and in a case where the azimuth change difference value is not larger than the preset change difference value, determining the position, which has the closest azimuth to the sound source position, as the candidate position.

Optionally, in an embodiment, the role separation module 404 is configured for: in a case where the target voice data is not the first voice data, calculating, according to the sound source information, an azimuth change difference value between the sound source position and a position, in existing positions, which has the closest azimuth to the sound source position; in a case where the azimuth change difference value is less than or equal to a preset change difference value and the similarity is larger than a preset similarity, determining a role corresponding to the similarity as the target role; and in a case where the azimuth change difference value is less than or equal to the preset change difference value and the similarity is less than or equal to the preset similarity, calculating similarities between voiceprint features corresponding to other positions within a region where the candidate position is located and the voiceprint feature of the target voice data, and determining a role corresponding to a voiceprint feature with a similarity larger than the preset similarity as the target role.

Optionally, in an embodiment, the role separation module 404 is further configured for: in a case where each of the similarities for the voiceprint features corresponding to the other positions within the region where the candidate position is located is less than or equal to the preset similarity, calculating similarities between voiceprint features corresponding to positions within other regions and the voiceprint feature of the target voice data, and determining a role corresponding to a voiceprint feature with a similarity larger than the preset similarity as the target role; and in a case where each of the similarities for the voiceprint features corresponding to the positions within the other regions is less than or equal to the preset similarity, generating a new role, as the target role, for the target voice data.

Optionally, in an embodiment, the role separation module 404 is further configured for: in a case where the number of the frames of the target voice data is less than or equal to the preset frame number, determining candidate voice data closest to an azimuth for the target voice data in historical voice data according to the sound source information; and calculating an azimuth difference between the target voice data and the candidate voice data; and in a case where the azimuth difference is less than a preset threshold value, determining the role corresponding to the candidate voice data as the target role.

According to the apparatus provided by the embodiment of the present application, sound source information of target voice data and a voiceprint feature of the target voice data are acquired, at least one candidate position corresponding to a sound source position is determined according to the sound source information, a similarity between a voiceprint feature of a role corresponding to the candidate position and the voiceprint feature of the target voice data is calculated, and a target role corresponding to the target voice data is determined according to the similarity. Because the candidate position is filtered first according to the sound source position indicated by the sound source information, which reduces the computation amount, and then, the similarity between the voiceprint feature of the role corresponding to the candidate position and the voiceprint feature of the target voice data is calculated, and the target role is determined according to the similarity, which takes into account both the sound source position and the voiceprint feature, and leads to higher accuracy of role separation.

Third Embodiment

Figure 5:
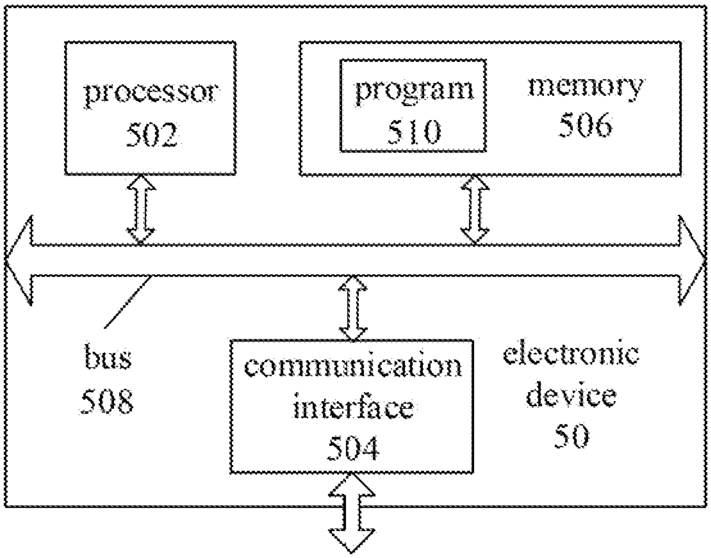
FIG. 5 is a structural diagram of an electronic device provided by a third embodiment of the present application.

Based on the method described in the first embodiment above, the third embodiment of the present application provides an electronic device for performing any one method described in the first embodiment above. Referring to FIG. 5, FIG. 5 is a structural schematic diagram of an electronic device provided by the third embodiment of the present application. The specific embodiments of the present application do not define the specific implementation of the electronic device.

As shown in FIG. 5, the electronic device 50 may include: a processor 502, a communications interface 504, a memory 506, and a communication bus 508.

Herein:

The processor 502, the communication interface 504, and the memory 506 communicate with each other via the communication bus 508.

The communication interface 504 is configured for communicating with other electronic devices, such as, a terminal device or a server.

The processor 502 is configured for executing a program 510, and may specifically perform relevant steps in the above method embodiments.

Specifically, the program 510 may include program codes. The program codes include computer operation instructions.

The processor 502 may be a central processor CPU, or an application specific integrated circuit (ASIC), or one or more integrated circuits configured for implementing the embodiments of the present application. The electronic device includes one or more processors. The one or more processors may be the same type of processors, such as one or more CPUs. The one or more processors may also be different types of processors, such as one or more CPUs and one or more ASICs.

The memory 506 is configured for storing a program 510. The memory 506 may include a high-speed random access memory (RAM), or may include a non-volatile memory (NVM), for example, at least one disk memory.

The program 510 may specifically be configured for causing the processor 502 to perform any one method in the above embodiments.

The specific implementation of each of steps in the program 510 may be referred to the corresponding description in the corresponding steps and units in the above method embodiment, and will not be repeated here. Those skilled in the art may clearly understand that, for the convenience and simplicity of the description, the specific working process of the above-described device and modules may refer to the corresponding process description in the above method embodiment, and will not be repeated here.

According to the electronic device provided by the embodiment of the present application, sound source information of target voice data and a voiceprint feature of the target voice data are acquired, at least one candidate position corresponding to a sound source position is determined according to the sound source information, a similarity between a voiceprint feature of a role corresponding to the candidate position and the voiceprint feature of the target voice data is calculated, and a target role corresponding to the target voice data is determined according to the similarity. Because the candidate position is filtered first according to the sound source position indicated by the sound source information, which reduces the computation amount, and then, the similarity between the voiceprint feature of the role corresponding to the candidate position and the voiceprint feature of the target voice data is calculated, and the target role is determined according to the similarity, which takes into account both the sound source position and the voiceprint feature, and leads to higher accuracy of role separation.

Fourth Embodiment

Based on the method described in the first embodiment above, the fourth embodiment of the present application provides a computer storage medium, which stores a computer program. The computer program, when executed by a processor, implements any one method described in the first embodiment.

It should be noted that according to the needs of implementation, each component/step described in the embodiments of the present application may be divided into more components/steps, or two or more components/steps or partial operations of components/steps may be combined into a new component/step, to achieve the purpose of the embodiments of the present application.

The above method according to the embodiment of the present application may be implemented in hardware, firmware, or be implemented as software or computer codes that may be stored in a recording medium (such as CD ROM, RAM, a floppy disk, a hard disk or a magneto-optical disk), or be implemented as computer codes downloaded through a network, which are originally stored in a remote recording medium or a non-transitory machine-readable medium and will be stored in a local recording medium, such that the method described herein may be processed by such software stored on the recording medium using a general-purpose computer, a special-purpose processor, or programmable or special hardware (such as ASIC or FPGA). It can be understood that a computer, a processor, a microprocessor controller, or programmable hardware includes a storage component (for example, RAM, ROM, a flash memory, etc.) that may store or receive software or computer codes. The role separation method described herein is implemented, when the software or computer codes are accessed and executed by the computer, the processor, or the hardware. In addition, when the general-purpose computer accesses the codes for implementing the role separation method shown herein, the execution of the codes converts the general-purpose computer into a special-purpose computer for executing the role separation method shown herein.

Those skilled in the art may realize that the units and method steps of each example described in connection with the embodiments disclosed herein can be implemented in electronic hardware, or a combination of computer software and electronic hardware. Whether these functions are performed in hardware or software depends on the specific application and the design constraint condition of the technical solution. Professional technicians may use different methods to implement the described functions for each specific application, but such implementation should not be considered to be beyond the scope of embodiments of the present application.

The above implementations are only used to illustrate the embodiments of the present application, not to limit the embodiments of the present application. Ordinary technicians in the relevant technical field may also make various changes and modifications without departing from the spirit and scope of the embodiments of the present application. Therefore, all equivalent technical solutions also belong to the scope of the embodiments of the present application, and the scope of patent protection of the embodiments of the present application shall be defined by the claims.

What is claimed is:

1. A role separation method, implemented by a processor of an electronic device, comprising:

acquiring i) sound source information of target voice data from sound waves received by a microphone acoustically coupled to the electronic device and dividing the target voice data into data frames for a time period and ii) a voiceprint feature of the target voice data by performing feature extraction on the target voice data using a neural network;

selecting, from a plurality of positions for respective speakers, a plurality of candidate positions according to a sound source position indicated by the sound source information;

determining, from the plurality of candidate positions, at least one candidate position based on an azimuth of each of the plurality of candidate positions relative to the sound source position;

calculating a similarity between a voiceprint feature of a role corresponding to the at least one candidate position and the voiceprint feature of the target voice data;

determining a target role corresponding to the target voice data according to the similarity;

determining whether a number of frames of the data frames of the target voice data is larger than a preset frame number;

in a case where the number of frames of the target voice data is larger than the preset frame number and the target voice data is not first voice data, calculating, according to the sound source information, an azimuth change difference value between the sound source position and a position, in existing positions, which has the closest azimuth to the sound source position, wherein the azimuth change difference value is a size of an angle from the sound source position to a reference and from the position which has the closest azimuth to the reference; and in a case where the azimuth change difference value is larger than a preset change difference value, determining the existing positions, other than the position which has the closest azimuth to the sound source position, as the candidate positions; and in a case where the azimuth change difference value is not larger than the preset change difference value, determining the position, which has the closest azimuth to the sound source position, as the candidate position.

2. The method of claim 1, wherein the determining the target role corresponding to the target voice data according to the similarity, comprises:

determining a role, from roles corresponding to the at least one candidate position, whose voiceprint feature corresponds to a largest similarity, as the target role.

3. The method of claim 1, further comprising in a case where the target voice data is the first voice data, generating a new position as a candidate position according to the sound source information of the target voice data.

4. The method of claim 1, wherein the determining the target role corresponding to the target voice data according to the similarity, comprises:

in a case where the target voice data is not the first voice data, calculating, according to the sound source information, an azimuth change difference value between the sound source position and a position, in existing positions, which has the closest azimuth to the sound source position;

in a case where the azimuth change difference value is less than or equal to a preset change difference value and the similarity is larger than a preset similarity, determining a role corresponding to the similarity as the target role; and in a case where the azimuth change difference value is less than or equal to the preset change difference value and the similarity is less than or equal to the preset similarity, calculating similarities between voiceprint features corresponding to other positions within a region where the candidate position is located and the voiceprint feature of the target voice data, and determining a role corresponding to a voiceprint feature with a similarity larger than the preset similarity as the target role.

5. The method of claim 4, further comprising:

in a case where each of the similarities for the voiceprint features corresponding to the other positions within the region where the candidate position is located is less than or equal to the preset similarity, calculating similarities between voiceprint features corresponding to positions within other regions and the voiceprint feature of the target voice data, and determining a role corresponding to a voiceprint feature with a similarity larger than the preset similarity as the target role; and in a case where each of the similarities for the voiceprint features corresponding to the positions within the other regions is less than or equal to the preset similarity, generating a new role, as the target role, for the target voice data.

6. The method of claim 1, further comprising:

in a case where the number of the frames of the target voice data is less than or equal to the preset frame number, determining candidate voice data closest to an azimuth for the target voice data according to historical voice data of the sound source information; and calculating an azimuth difference between the target voice data and the candidate voice data, and in a case where the azimuth difference is less than a preset threshold value, determining a role corresponding to the candidate voice data as the target role.

7. The method of claim 1, further comprising:

recording a corresponding relationship between the target role and a candidate position with a highest voiceprint feature similarity;

determining whether candidate positions in multiple pieces of target voice data corresponding to the target role have changed, according to the corresponding relationship; and in a case where the candidate positions in the multiple pieces of target voice data corresponding to the target role have changed, determining position change information of the target role according to the change.

8. The method of claim 1, further comprising:

determining a space partition to which a sound source position indicated by the sound source information belongs, and determining at least one candidate position corresponding to the sound source position in the space partition, wherein the space partition is one of multiple space regions formed after a physical space, where a speaker corresponding to the target voice data is located, is spatially divided according to a preset angle.

9. The method of claim 8, wherein the determining the at least one candidate position corresponding to the sound source position in the space partition, comprises:

determining whether there is a candidate position corresponding to the sound source position in the space partition;

in a case where there is the candidate position corresponding to the sound source position in the space partition, determining the candidate position as the candidate position corresponding to the sound source position in the space partition; and in a case where there is not the candidate position corresponding to the sound source position in the space partition, creating a candidate position in the space partition according to the sound source position.

10. An electronic device, comprising: a processor, a memory, a communication interface and a communication bus, wherein the processor, the memory and the communication interface communicate with each other via the communication bus; and the memory is configured for storing at least one executable instruction, and the at least one executable instruction causes the processor to perform operations corresponding to the role separation method of claim 1.

11. A non-transitory computer storage medium, storing a computer program, wherein the computer program, when executed by a processor, implements the role separation method of claim 1.

* * * * *